United States Patent
Bravo et al.

(10) Patent No.: US 12,206,546 B2
(45) Date of Patent: Jan. 21, 2025

(54) AUTOMATIC DEVICE ENROLLMENT IN AN INTERNET OF THINGS NETWORK

(71) Applicant: KYNDRYL, INC., New York, NY (US)

(72) Inventors: Cesar Augusto Rodriguez Bravo, Alajuela (CR); Edgar Adolfo Zamora Duran, Heredia (CR); Franz Friedrich Liebinger Portela, Heredia (CR)

(73) Assignee: Kyndryl, Inc., New York, NY (US)

( * ) Notice: Subject to any disclaimer, the term of this patent is extended or adjusted under 35 U.S.C. 154(b) by 145 days.

(21) Appl. No.: 17/205,045

(22) Filed: Mar. 18, 2021

(65) Prior Publication Data

US 2022/0303179 A1    Sep. 22, 2022

(51) Int. Cl.
| | |
|---|---|
| *H04L 41/0806* | (2022.01) |
| *G16Y 30/00* | (2020.01) |
| *H04L 41/084* | (2022.01) |
| *H04L 41/0853* | (2022.01) |
| *H04L 41/0893* | (2022.01) |

(52) U.S. Cl.
CPC .......... *H04L 41/0806* (2013.01); *G16Y 30/00* (2020.01); *H04L 41/084* (2013.01); *H04L 41/0846* (2013.01); *H04L 41/0853* (2013.01); *H04L 41/0893* (2013.01)

(58) Field of Classification Search
CPC ............... H04L 41/0806; H04L 41/084; H04L 41/0846; H04L 41/0853; H04L 41/0893; H04L 12/2809; G16Y 30/00
See application file for complete search history.

(56) References Cited

U.S. PATENT DOCUMENTS

| | | | |
|---|---|---|---|
| 9,521,642 B2 | 12/2016 | Benoit | |
| 10,581,618 B2 | 3/2020 | Moses | |
| 10,602,353 B1 * | 3/2020 | Berdy | H04W 4/70 |
| 2012/0287817 A1 * | 11/2012 | Yamaguchi | H04L 41/0846 |
| | | | 370/254 |

(Continued)

FOREIGN PATENT DOCUMENTS

| | | | | |
|---|---|---|---|---|
| CN | 104735054 A | * | 6/2015 | ............. H04L 92/06 |
| WO | 2019210951 A1 | | 11/2019 | |

OTHER PUBLICATIONS

Liu et al., "A Security Framework for the Internet of Things in the Future Internet Architecture", Future Internet 2017, 9, 27; doi: 10.3390/fi9030027, pp. 1-29, <www.mdpi.com/journal/futureinternet>.

*Primary Examiner* — Abdulkader M Alriyashi
(74) *Attorney, Agent, or Firm* — Dan Housley; Andrew M. Calderon; Calderon Safran & Wright P.C.

(57) ABSTRACT

In an approach to automatic device enrollment in an IoT network, responsive to receiving a request to add a new device to an IoT network, device metadata is requested from the new device. Responsive to receiving the device metadata, the device metadata is confirmed with the device manufacturer using secure information services. Responsive to confirming the device metadata with the device manufacturer, configuration data for the new device is gathered from a repository, where the configuration data is gathered from devices with a same context type in the repository. Responsive to gathering the configuration data for the new device from the repository, the new device is enrolled in the IoT network using the configuration data.

20 Claims, 4 Drawing Sheets

(56) References Cited

U.S. PATENT DOCUMENTS

| | | |
|---|---|---|
| 2014/0241354 A1 | 8/2014 | Shuman |
| 2014/0244768 A1 | 8/2014 | Shuman |
| 2014/0244834 A1 | 8/2014 | Guedalia |
| 2015/0222621 A1 | 8/2015 | Baum |
| 2015/0242066 A1* | 8/2015 | Chen .................. H04L 41/0806 715/738 |
| 2016/0105317 A1* | 4/2016 | Zimmermann ..... G06F 9/45533 709/221 |
| 2018/0109650 A1 | 4/2018 | Berdy |
| 2018/0351803 A1* | 12/2018 | Givehchi ........... G05B 19/0426 |
| 2019/0132318 A1* | 5/2019 | Kim ........................ H04L 43/10 |

* cited by examiner

AUTOMATIC DEVICE ENROLLMENT IN AN INTERNET OF THINGS NETWORK

BACKGROUND

The present invention relates generally to the field of network-based applications, and more particularly to automatic device enrollment in an Internet of Things (IoT) network.

The Internet of Things refers to the ever-growing network of physical objects that feature an IP address for internet connectivity specifically, or other network connectivity generally, and the communication that occurs between these objects and other network-enabled devices and systems. A home IoT network may include many different types of IoT devices, for example, smart locks, cameras, lighting controls, smart appliances, garage door openers, entertainment equipment, mobile devices, etc.

SUMMARY

Embodiments of the present invention disclose a method, a computer program product, and a system for automatic device enrollment in an IoT network. In one embodiment, responsive to receiving a request to add a new device to an IoT network, device metadata is requested from the new device. Responsive to receiving the device metadata, the device metadata is confirmed with the device manufacturer using secure information services. Responsive to confirming the device metadata with the device manufacturer, configuration data for the new device is gathered from a repository, where the configuration data is gathered from devices with a same context type in the repository. Responsive to gathering the configuration data for the new device from the repository, the new device is enrolled in the IoT network using the configuration data.

DETAILED DESCRIPTION

Enrollment of devices to IoT networks is still a very manual process that is time consuming and prone to errors. For example, in a home IoT network, a smart lock needs the passwords or fingerprints for each person authorized entry via the lock, and the schedules by role of the personnel and inhabitants. Current enrollment mechanisms are centered on security, using methods like certificates from a Certificate Authority (CA) and Public Key Infrastructure (PKI) to authenticate and secure the device, but the process of enrollment is still manual. The current process is clearly inconvenient when you have to maintain several smart locks, mobile devices, TVs, freezers, garage doors, and another set of appliances.

The present invention describes a mechanism that addresses this issue by automating the enrollment process based on the classification of the new and existing devices in the IoT network, the gathering and verification of manufacturer information, and configurations sharing. The present invention describes a mechanism by which a device can be securely and automatically enrolled and configured in an IoT network by an IoT controller which checks the device type, function, and required data, validates the device model data with the manufacturer and, if security considerations are met, grants accesses to the device and shares configurations of devices of the same type.

The present invention is a method, computer program product, and system that automates the enrollment of devices in IoT networks. In a typical embodiment, the present invention includes an IoT controller for the IoT network; a database that keeps the configuration data for the IoT network devices, the device classifications, configurations and properties; a set of services available for each of the different manufacturers of devices capable of validating identification data of devices and providing basic configurations; a classification of devices based on the type, function and the necessary device data; sharing of configuration information between devices of the same type and model; sharing of access control information (authorized list of users, private encryption keys, etc.); sharing of preconfigured routines (e.g., IFTTT, etc.); and enrollment with Artificial Intelligence (AI) assistants.

The present invention improves security by requiring less manual configuration, reduces the configurations tasks for the owners of the IoT networks and devices, prevents the use of default credentials on IoT devices, and ensures standardization of configurations across the entire IoT network.

In an embodiment, the IoT controller manages the membership of the IoT network. Each device has a primary context, which is used by the IoT controller to create groups of devices. These groups are qualified to manage specific types of data. Some examples of context types are Financial, Health, Physical security, Personal, and Appliance. New devices request membership to the IoT network from the IoT controller, which in turn requests metadata from the device (e.g., context, manufacturer, serial number, model number). The controller then confirms all this information with the device manufacturer through enabled information services (e.g., web services, API, etc.). This way, only "known" devices will be allowed to enter the IoT network.

In an embodiment, the information services are secured so only trusted authorized entities can update it. The IoT network database keeps all data required by the system to run (profiles, context types, etc.). The IoT controller can ask the user to authorize devices that it cannot completely identify, such as those with minimal configuration, where the configuration data is insufficient to uniquely identify the device. Also, the user can request to be the approver of all addition of new devices to the IoT network (after system validation flow is completed).

In an embodiment, the user can create predefined rules regarding the addition of new IoT devices where certain devices can be added by the system, other devices can only be added by the user, or a combination of both. The IoT controller, based on the new device context, model and type, gathers configuration data from the devices with the same context type. For example, a new door lock can obtain the configuration from an existing door lock and avoid having the user manually configure the lock. This may include a list of authorized users, encrypted authentication data, entry codes, etc.

Additionally, the automatic enrollment process may be based on predefined rules. Some example of those predefined rules can include, but are not limited to: a device that is already connected to the home network (Wi-Fi/LAN); a device that is the same brand and model of another member of the network (this can be achieved by using web services or APIs to connected to the manufacturer site); by purchase history (since the device may have access to the credit card information of the user, the controller may be able to see if the device that has requested access to the IoT network was recently purchased by the user); or if the device was already part of the network (in case the device was removed from the network and then added again). This can be controlled by having a log of all devices that have been part of the IoT network (using any identification method such as the MAC address, serial number, etc., of the new device). This automatic enrollment option can trigger alerts/notifications to the user to enhance the level of security.

Figure 1:
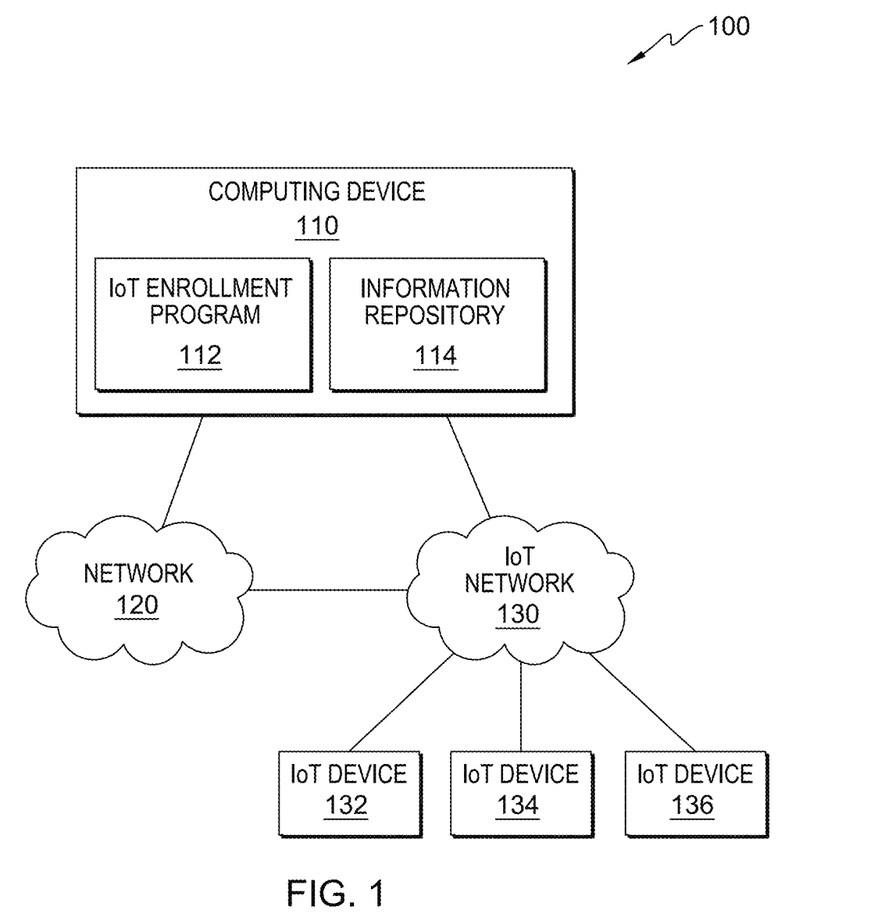
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of IoT enrollment program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, connected to both network 120 and IoT network 130, and IoT devices 132, 134, and 136, all connected to IoT network 130. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, IoT network 130, and other computing devices (not shown) within distributed data processing environment 100.

IoT network 130 allows communication between any number of IoT devices and will allow access to the internet or any other network access required by any of the IoT devices or programs running on the IoT devices. In an embodiment, IoT network 130 is separate from network 120. In another embodiment, IoT network 130 is part of network 120. IoT network 130 can include one or more wired and/or wireless networks that are capable of receiving and transmitting data, voice, and/or video signals. In general, IoT network 130 can be any combination of connections and protocols that will support communications between computing device 110 and IoT devices 132, 134, and 136.

Computing device 110 can be a standalone computing device, a management server, a web server, a mobile computing device, or any other electronic device or computing system capable of receiving, sending, and processing data.

In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes IoT enrollment program 112. In an embodiment, IoT enrollment program 112 is a program, application, or subprogram of a larger program for automatic device enrollment in an IoT network. In an alternative embodiment, IoT enrollment program 112 may be located on any other device accessible by computing device 110 via network 120.

In an embodiment, computing device 110 includes information repository 114. In an embodiment, information repository 114 may be managed by IoT enrollment program 112. In an alternate embodiment, information repository 114 may be managed by the operating system of the device, alone, or together with, IoT enrollment program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, IoT device data, software data, IoT network configuration data, user data, system configuration data, and other data that is received by IoT enrollment program 112 from one or more sources, and data that is created by IoT enrollment program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Distributed data processing environment 100 includes the IoT devices 132, 134, and 136. In an embodiment, IoT devices 132, 134, and 136 are devices that connect to each other and to computing device 110 over IoT network 130. In an embodiment, IoT devices 132, 134, and 136 may connect via a wired network connection. In another embodiment, IoT devices 132, 134, and 136 may connect via a wireless network connection. In yet another embodiment, IoT devices 132, 134, and 136 may connect via any method that is appropriate for connecting IoT devices as would be known to those skilled in the art.

In an embodiment, IoT devices 132, 134, and 136 may be, for example, smart locks, mobile devices, appliances, such as a smart IoT enabled refrigerator, garage door openers, and entertainment equipment. In an embodiment, distributed data processing environment 100 may include any number of IoT devices 132, 134, and 136.

Figure 2:
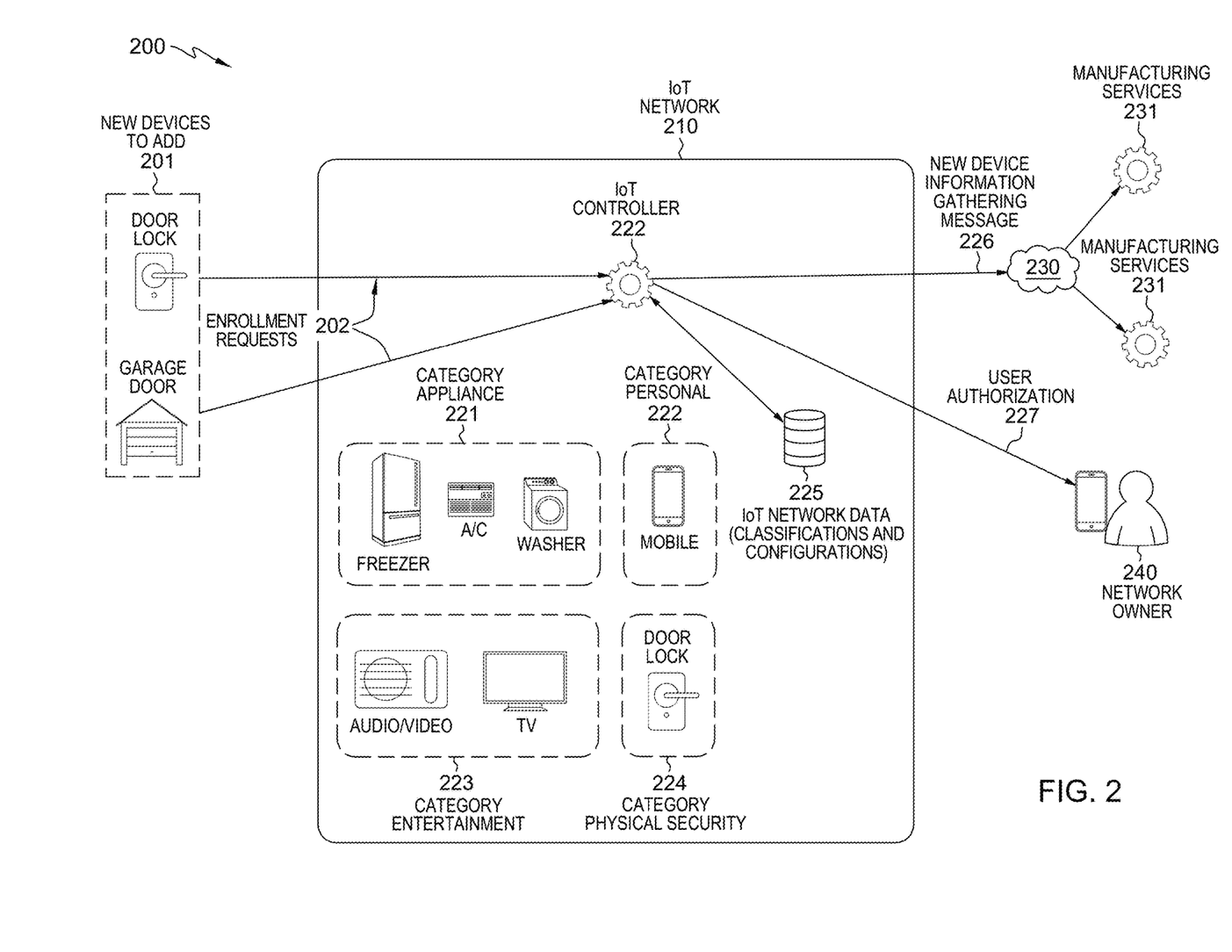
FIG. 2 is an example system overview, in accordance with an embodiment of the present invention.

FIG. 2 is an example system overview, generally designated 200, in accordance with an embodiment of the present invention. It includes New Devices 201, which are devices that are to be added to the IoT network. New devices 201 send Enrollment Requests 202 to IoT Controller 220, which manages the membership of the IoT network, to gain membership in IoT Network 210. IoT network 210 allows communication between any number of IoT devices and will allow access to the Internet or any other network access required by any of the IoT devices or programs running on the IoT devices. This is an example of IoT network 130 from FIG. 1.

In addition to IoT controller 220, IoT network 210 includes IoT Network Data 225, which is a repository that stores the classifications and configuration data for the categories of IoT devices. In an embodiment, the categories are based on the classifications and configuration data that is managed by that group of IOT devices. For example, devices in the category entertainment may have access to my credit card data (required for example to pay for a movie using a smart watch), while devices on the appliance categories have no need for credit card data and therefore may not be allowed to access credit card information. In an embodiment, the configurations and parameters for the classification and categories are the one stored in IoT network data 225.

In an embodiment, IoT network data 225 is contained in information repository 114 of FIG. 1. In another embodiment, IoT network data 225 is separate from information repository 114 of FIG. 1. IoT network 130 also includes all the IoT devices that are enrolled in the IoT network. These IoT devices are arranged in IoT Categories 221-224. These categories contain groups that are qualified to manage specific types of data. Each device has a primary context, which is used by the IoT controller to create groups of devices that are arranged in the categories. In the example of FIG. 2, four different categories are illustrated, Category Appliance 221, Category Mobile 222, Category Entertainment 223, and Category Physical Security 224.

When new devices 201 send enrollment requests 202 to IoT controller 220 to join IoT network 210, IoT controller 220 sends New Device Information Gathering Messages 226 to Manufacturer Services 231 via network 230, e.g., network 120 from FIG. 1, to verify that the devices that are attempting to join the network are genuine devices. New device information gathering messages 226 are requests from IoT controller 220 to the manufacturer of the new IoT device that is enrolling in IoT network 210 to get information on the new IoT device, such as model and serial numbers, to verify that the device is actually the device it claims to be, and not a false device attempting to infiltrate the system. Manufacturer services 231 are enabled information services (web services, API, etc.) maintained by the manufacturers of the IoT devices. This way, only "known" devices will be enabled to enter the IoT network. The information services are secured so only trusted authorized entities can update the information services. IoT network data 225 is a database or repository that keeps all data required by the system for the IoT devices to run (profiles, context types, etc.).

In the case that the new device cannot be completely identified, such as when the device contains minimal configuration data making identification difficult, IoT controller 220 will send User Authorization Request 227 to Network Owner 240, the user or owner that authorizes devices to be enrolled in IoT network 210. User authorization request 227 can also be sent by IoT controller 220 when network owner 240 has directed that any new device needs to be authorized prior to joining the IoT network.

Once the device has been verified with the manufacturer, and user authorization has been received if required, then IoT controller 220 will use the data stored in IoT network data 225 for the category of the new device, along with any data received from the manufacturer, to enroll and configure new devices 201 in IoT network 210.

Figure 3:
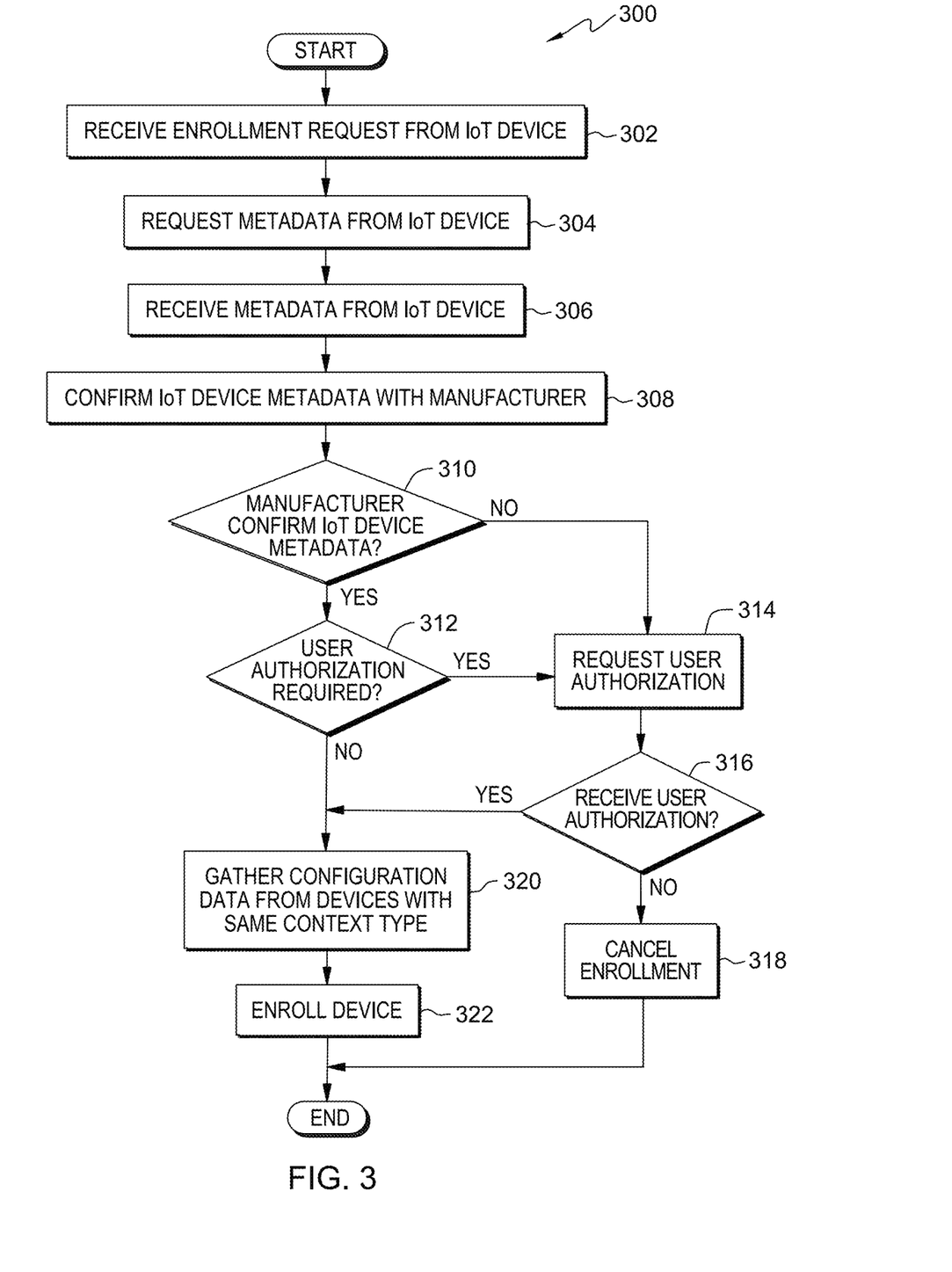
FIG. 3 is a flowchart depicting operational steps of the IoT enrollment program, on a computing device within the distributed data processing environment of FIG. 1, for automatic device enrollment in an IoT network, in accordance with an embodiment of the present invention.

FIG. 3 is a flow chart diagram of workflow 300 depicting operational steps for IoT enrollment program 112, in accordance with an embodiment of the present invention. In an alternative embodiment, the steps of workflow 300 may be performed by any other program while working with IoT enrollment program 112.

In an embodiment, IoT enrollment program 112 receives an enrollment request from a new IoT device, e.g., new devices 201 from FIG. 2, to join an IoT network, e.g., IoT network 210 from FIG. 2. In an embodiment, in response to receiving an enrollment request from a new IoT device, IoT enrollment program 112 sends a request to the new IoT device for device metadata. In an embodiment, IoT enrollment program 112 receives the device metadata that was requested in step 304 from the new IoT device. In an embodiment, IoT enrollment program 112 sends a request, e.g., new device information gathering message 226, to the manufacturer through enabled information services, e.g., web services, API, etc. In an embodiment, IoT enrollment program 112 sends a request, e.g., new device information gathering message 226 from FIG. 2, to the manufacturer through enabled information services, e.g., web services, API, etc., to confirm that the device metadata received from the new IoT device is valid for a genuine device from that manufacturer. In an embodiment, if IoT enrollment program 112 determines that it cannot completely identify the new IoT device, for example, a device with minimal configuration that is insufficient to uniquely identify the device, or if the user has required that all new IoT devices get user approval prior to adding the new IoT device to the IoT network, then IoT enrollment program 112 determines that user authorization is required. In an embodiment, if IoT enrollment program 112 determines that user authorization is required, then IoT enrollment program 112 sends a request for authorization to the user or network owner. In an embodiment, if IoT enrollment program 112 cannot confirm the IoT device metadata with the manufacturer, or if IoT enrollment program 112 determines that user authorization is required and the response from the user is negative, then IoT enrollment program 112 cancels the enrollment request, disconnects the new IoT device from the IoT network, and does not allow the new IoT device to join the IoT network. IoT enrollment program 112 then ends for this cycle. In an embodiment, if IoT enrollment program 112 that user authorization is not required or, if IoT enrollment program 112 that user authorization is required, and IoT enrollment program 112 receives user authorization, then IoT enrollment program 112, based on the new device context, model and type, gathers configuration data from the devices with the same context type. In an embodiment, IoT enrollment program 112 enrolls the new IoT device using the configuration data as well as the information gathered from the device manufacturer. In an embodiment, IoT enrollment program 112 then ends for this cycle.

It should be appreciated that embodiments of the present invention provide at least for the steps of IoT enrollment program 112 for automatic device enrollment in an IoT network. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 3 illustrates one possible iteration of IoT enrollment program 112, which repeats each time a new IoT device attempts to enroll in the IoT network.

IoT enrollment program 112 receives an enrollment request from an IoT device (step 302). In an embodiment, IoT enrollment program 112 receives an enrollment request from a new IoT device, e.g., new devices 201 from FIG. 2, to join an IoT network, e.g., IoT network 210 from FIG. 2.

IoT enrollment program 112 requests metadata from the IoT device (step 304). In an embodiment, in response to receiving an enrollment request from a new IoT device, IoT enrollment program 112 sends a request to the new IoT device for device metadata. In an embodiment, the device metadata may include, but is not limited to, a context, the device manufacturer, device serial number, and device model number.

IoT enrollment program 112 receives metadata from the IoT device (step 306). In an embodiment, IoT enrollment program 112 receives the device metadata that was requested in step 304 from the new IoT device.

IoT enrollment program 112 confirms the IoT device metadata with the manufacturer (step 308). In an embodiment, IoT enrollment program 112 sends a request, e.g., new device information gathering message 226 from FIG. 2, to the manufacturer through enabled information services, e.g., web services, API, etc., to confirm that the device metadata received from the new IoT device in step 306 is valid for a genuine device from that manufacturer.

In an embodiment, IoT enrollment program 112 determines whether the metadata confirmed with the manufacturer conforms to a set of predetermined rules. In an embodiment, in response to determining that the metadata conforms to a rule in the set of predetermined rules, IoT enrollment program 112 updates the IoT network data repository, e.g., IoT network data 225 of FIG. 2, with the IoT network data including classifications and configurations with known information from the manufacturer. In this way, only devices that have been validated as genuine will be enabled to enter the IoT network.

In an embodiment, these predefined rules may include, but are not limited to, a device that is already connected to the home network (Wi-Fi/LAN); a device that is the same brand/model as another member of the network (which is verified by using web services or APIs to connect to the manufacturer site as described previously), or by purchase history (since the device has access to the user's credit card information, it may be able to determine if the device that is requesting access to the IoT network was recently purchased by the user), or if the device was already part of the network (in the case where the device was removed from the network and then added again). This last case can be controlled by IoT enrollment program 112 keeping a log of all devices that have been part of the IoT network using any identification method, such as MAC address, serial number, etc., as would be known to a person having skill in the art.

IoT enrollment program 112 determines if the manufacturer confirmed the IoT device metadata (decision block 310). In an embodiment, only devices that have been validated as genuine will be enabled to enter the IoT Network. In an embodiment, if IoT enrollment program 112 determines that the manufacturer confirms the IoT device metadata ("yes" branch, decision block 310), then IoT enrollment program proceeds to Decision Block 312 to determine if user authorization is required. In an embodiment, if IoT enrollment program 112 determines that the manufacturer cannot confirm the IoT device metadata ("no" branch, decision block 310), then IoT enrollment program proceeds to step 314 to user authorization to enroll the device.

IoT enrollment program 112 determines if user authorization is required (decision block 312). In an embodiment, if IoT enrollment program 112 determines that it cannot completely identify the new IoT device, for example, a device with minimal configuration that is insufficient to uniquely identify the device, or if the user has required that all new IoT devices get user approval prior to adding the new IoT device to the IoT network, then IoT enrollment program 112 determines that user authorization is required. In an embodiment, if IoT enrollment program 112 determines that user authorization is not required ("no" branch, decision block 312), then IoT enrollment program continues to step 320 to gather configuration data. In an embodiment, if IoT enrollment program determines that user authorization is required ("yes" branch, decision block 312), then IoT enrollment program proceeds to step 314 to request the authorization from the user or IoT network owner.

IoT enrollment program 112 requests user authorization (step 314). In an embodiment, if IoT enrollment program 112 determines that the manufacturer cannot confirm the IoT device metadata, or if IoT enrollment program 112 determines that user authorization is required, then IoT enrollment program 112 sends a request for authorization to the user or network owner. In an embodiment, this request is sent to the user as a message to a user device, such as a smart phone. In another embodiment, the request is sent to the user as an email. In yet another embodiment, the request is sent to the user via an instance of IoT enrollment program 112 running on a computing device. In other embodiments, the request is sent to the user via any method as would be known to a person of skill in the art.

IoT enrollment program 112 determines if user authorization was received (decision block 316). In an embodiment, IoT enrollment program 112 receives the response from the user. In an embodiment, if the response is negative, ("no" branch, decision block 312), then IoT enrollment program 112 proceeds to step 318 to cancel the enrollment request. In an embodiment, if the response is positive ("yes" branch, decision block 312), then IoT enrollment program continues to step 320 to gather configuration data.

IoT enrollment program 112 cancels the enrollment (step 318). In an embodiment, if IoT enrollment program 112 cannot confirm the IoT device metadata with the manufacturer, or if IoT enrollment program 112 determines that user authorization is required and the response from the user is negative, then IoT enrollment program 112 cancels the enrollment request, disconnects the new IoT device from the IoT network, and does not allow the new IoT device to join the IoT network. IoT enrollment program 112 then ends for this cycle.

IoT enrollment program 112 gathers configuration data from devices with the same context type (step 320). In an embodiment, if IoT enrollment program 112 determines that user authorization is not required or, if IoT enrollment program 112 determines that user authorization is required, and IoT enrollment program 112 receives user authorization, then IoT enrollment program 112 gathers configuration data from the devices with the same context type based on the new device context, model, and type. For example, a new door lock can obtain the configuration data from an existing door lock and avoid the user to have to go through the configuration of the new lock. In an embodiment, this may include a list of authorized users, encrypted authentication data, user unlock codes, etc.

In an embodiment, if IoT enrollment program 112 determines that there are no devices in the repository with a similar context to the new device, then IoT enrollment program 112 notifies the user that the new device cannot be automatically enrolled. In an embodiment, IoT enrollment program 112 then ends for this cycle.

IoT enrollment program 112 enrolls the device (step 322). In an embodiment, IoT enrollment program 112 enrolls the new IoT device using the configuration data gathered in step 320 as well as the information gathered from the device manufacturer in decision block 310. In an embodiment, IoT enrollment program 112 then ends for this cycle.

Figure 4:
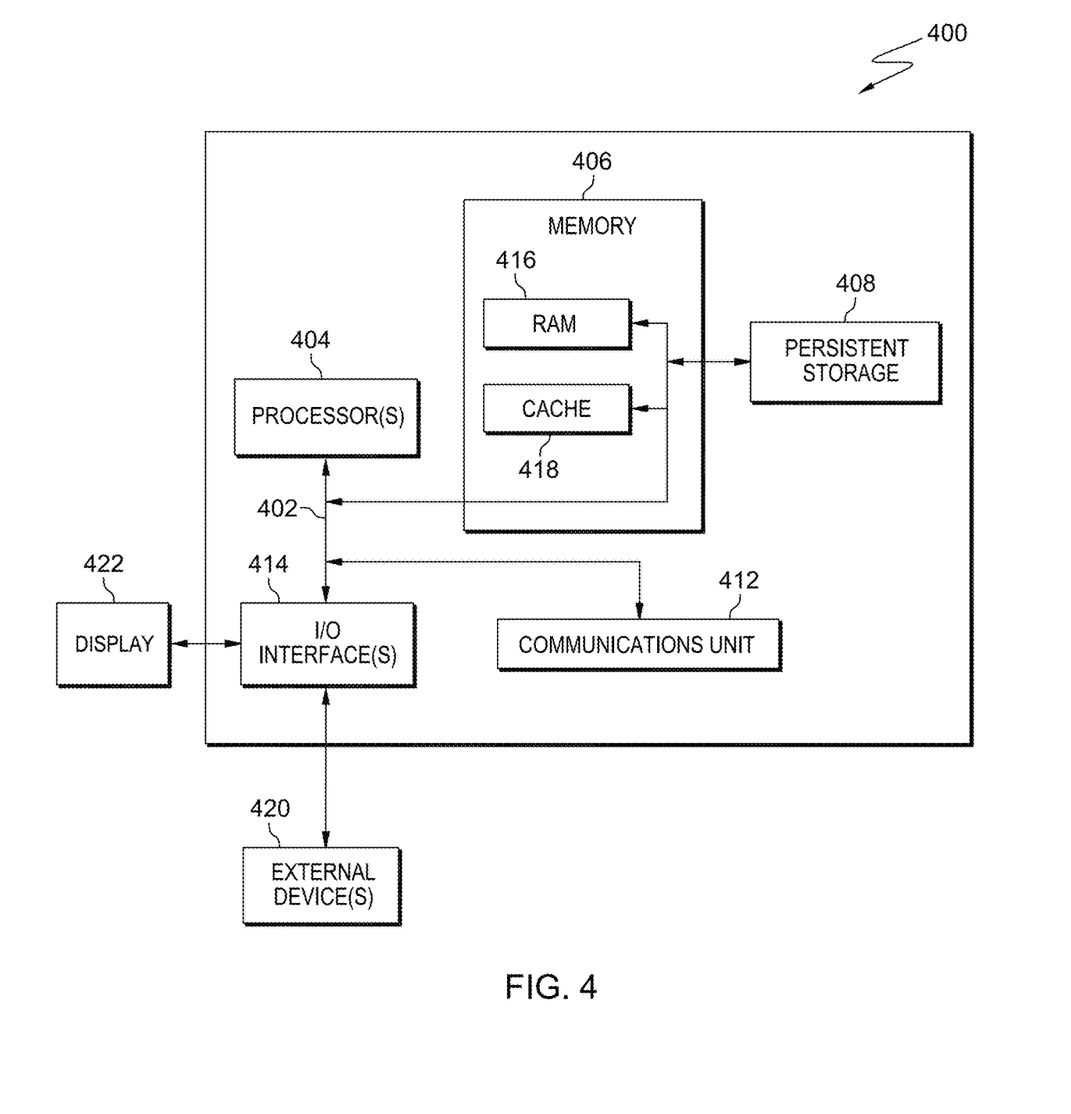
FIG. 4 depicts a block diagram of components of the computing devices executing the IoT enrollment program within the distributed data processing environment of FIG. 1, in accordance with an embodiment of the present invention.

FIG. 4 is a block diagram depicting components of computing device 110 suitable for IoT enrollment program 112, in accordance with at least one embodiment of the invention. FIG. 4 displays computer 400; one or more processor(s) 404 (including one or more computer processors); communications fabric 402; memory 406, including random-access memory (RAM) 416 and cache 418; persistent storage 408; communications unit 412; I/O interfaces 414; display 422; and external devices 420. It should be appreciated that FIG. 4 provides only an illustration of one embodiment and does not imply any limitations with regard to the environments in which different embodiments may be implemented. Many modifications to the depicted environment may be made.

As depicted, computer 400 operates over communications fabric 402, which provides communications between computer processor(s) 404, memory 406, persistent storage 408, communications unit 412, and I/O interface(s) 414. Communications fabric 402 may be implemented with any architecture suitable for passing data or control information between processors 404 (e.g., microprocessors, communications processors, and network processors), memory 406, external devices 420, and any other hardware components within a system. For example, communications fabric 402 may be implemented with one or more buses.

Memory 406 and persistent storage 408 are computer readable storage media. In the depicted embodiment, memory 406 comprises RAM 416 and cache 418. In general, memory 406 can include any suitable volatile or non-volatile computer readable storage media. Cache 418 is a fast memory that enhances the performance of processor(s) 404 by holding recently accessed data, and near recently accessed data, from RAM 416.

Program instructions for IoT enrollment program 112 may be stored in persistent storage 408, or more generally, any computer readable storage media, for execution by one or more of the respective computer processors 404 via one or more memories of memory 406. Persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. In the context of some embodiments of the present invention, the source of the various input data may be physically remote to computer 400 such that the input data may be received, and the output similarly transmitted via communications unit 412.

I/O interface(s) 414 allows for input and output of data with other devices that may be connected to computer 400. For example, I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., IoT enrollment program 112, can be stored on such portable computer readable storage media and can be loaded onto persistent storage 408 via I/O interface(s) 414. I/O interface(s) 414 also connect to display 422.

Display 422 provides a mechanism to display data to a user and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to receiving a request to add a new device to an Internet of Things (IoT) network, requesting, by one or more computer processors, a device metadata from the new device, wherein the device metadata includes a context of the new device;
responsive to receiving the device metadata from the new device, requesting, by the one or more computer processors, verification from a manufacturer of the new device that the new device is not a false device based on the device metadata, wherein the device metadata is verified using secured information services maintained by the manufacturer of the new device, wherein the secured information services include at least one of web services and application programming interfaces (APIs) maintained by the manufacturer of the new device;
responsive to verifying the device metadata with the manufacturer of the new device, gathering, by the one or more computer processors, a configuration data for the new device from a repository, wherein the configuration data for the new device is gathered from one or more devices with a same context, type, and model, in the repository, as the context of the new device included in the device metadata;

responsive to gathering the configuration data for the new device from the repository, enrolling, by the one or more computer processors, the new device in the IoT network, wherein the new device is enrolled using the configuration data including the context, type, and model of the one or more devices with the same context, type, and model;

using the context of the new device to arrange the new device in an IoT category selected from a group of IoT categories including the one or more devices with the same context, type, and model; and sending a user authorization request to a network owner responsive to the new device not being able to be completely identified due to the new device containing minimal configuration data comprising the context, type, and model of the new device sufficient to uniquely identify the new device.

2. The computer-implemented method of claim 1, wherein responsive to gathering the configuration data for the new device from the repository, enrolling the new device in the IoT network, wherein the new device is enrolled using the configuration data from the repository comprises:

responsive to determining that authorization from a user is required to enroll the new device, requesting, by the one or more computer processors, the authorization from the user; and responsive to receiving the authorization from the user, enrolling, by the one or more computer processors, the new device in the IoT network, wherein the new device is enrolled using the configuration data from the repository.

3. The computer-implemented method of claim 2, wherein responsive to receiving the authorization from the user, enrolling the new device in the IoT network, wherein the new device is enrolled using the configuration data from the repository further comprises:

updating, by one or more computer processors, the repository, wherein the repository is updated with the device metadata from the new device, wherein the device metadata comprises a device manufacturer, a device serial number, and a device model number.

4. The computer-implemented method of claim 1, wherein responsive to verifying the device metadata with the device manufacturer, gathering the configuration data for the new device from the repository, wherein the configuration data is gathered from the one or more devices with the same context type in the repository comprises:

responsive to the device manufacturer not verifying the device metadata, requesting, by the one or more computer processors, authorization to enroll the new device from a user; and responsive to receiving the authorization from the user, gathering, by the one or more computer processors, the configuration data for the new device from the repository, wherein the configuration data from the repository is gathered from the one or more devices with the same context type, wherein the context type comprises at least one of a financial type, a health type, a physical security, a personal type, and an appliance type.

5. The computer-implemented method of claim 1, wherein responsive to confirming the device metadata with the device manufacturer, gathering the configuration data for the new device from the repository, wherein the configuration data is gathered from the one or more devices with the same context type in the repository comprises:

responsive to confirming the device metadata with the device manufacturer, determining, by the one or more computer processors, whether the device metadata conforms to at least one rule in a set of predetermined rules, wherein the predetermined rules comprise a device that is already connected to a home network, a device that is the same model as another member device of the network which is verified by using APIs to connect to a manufacturer site, by purchase history, or if the device was already part of the network;

updating, by the one or more computer processors, the repository with manufacturer data, wherein the manufacturer data includes at least one of classifications and configurations with known information; and gathering, by the one or more computer processors, the configuration data for the new device from the repository, wherein the configuration data is gathered from the one or more devices with the same context type in the repository.

6. The computer-implemented method of claim 1, further comprising: configuring, by the one or more computer processors, the new device using the configuration data from the repository, wherein the configuration data comprises authorized users and encrypted authentication data, wherein the configuration data is gathered from the one or more devices with the same context, type, and model in the repository.

7. The computer-implemented method of claim 1, further comprising:

storing, in the repository, classification and configuration data for the IoT categories;

receiving an enrollment request from the new device at an IoT controller to join the IoT network;

sending a request to the new device for the device metadata; and sending, from the IoT controller, a new device information gathering message to a manufacturer services through the API to verify that the new device attempting to join the IoT network is a device it claims to be and not a false device attempting to infiltrate the IoT network.

8. The computer-implemented method of claim 7, wherein the IoT categories contain groups qualified to manage specific types of data, wherein the new device is enrolled also using the IoT category, and wherein the IoT category is selected from a set of IoT categories consisting of Category Appliance, Category Mobile, Category Entertainment, and Category Physical Security, if the device metadata cannot be confirmed with the manufacturer or it is determined that user authorization request is required and a response is negative, then the enrollment request is cancelled, the new device is disconnected from the IoT network, and the new device is not allowed to join the IoT network, and the enrolling includes, once the new device has been verified with the manufacturer, and user authorization has been received, the IoT controller using data stored in an IoT network data for the category of the new device, along with any data received from the manufacturer, to enroll and configure the new device in IoT network.

9. A computer program product comprising one or more computer readable storage media and program instructions stored on the one or more computer readable storage media, the program instructions including instructions to:
- responsive to receiving a request to add a new device to an Internet of Things (IoT) network, request a device metadata from the new device, wherein the device metadata includes a context of the new device;
- responsive to receiving the device metadata from the new device, request verification from a manufacturer of the new device that the new device is not a false device based on the device metadata, wherein the device metadata is verified using secured information services maintained by the manufacturer of the new device, wherein the secured information services include at least one of web services and application programming interfaces (APIs) maintained by the manufacturer of the new device;
- responsive to verifying the device metadata with the device manufacturer, gather a configuration data for the new device from a repository, wherein the configuration data for the new device is gathered from one or more devices with a same context, type, and model, in the repository, as the context of the new device included in the device metadata;
- responsive to gathering the configuration data for the new device from the repository, enroll the new device in the IoT network, wherein the new device is enrolled using the configuration data including the context, type, and model of the one or more devices with the same context, type, and model;
- use the context of the new device to arrange the new device in an IoT category selected from a group of IoT categories including the one or more devices with the same context, type, and model; and
- send a user authorization request to a network owner responsive to the new device not being able to be completely identified due to the new device containing minimal configuration data comprising the context, type, and model of the new device sufficient to uniquely identify the new device.

10. The computer program product of claim 9, wherein the program instructions to, responsive to gathering the configuration data for the new device from the repository, enroll the new device in the IoT network, wherein the new device is enrolled using the configuration data comprises one or more of the following program instructions, stored on the one or more computer readable storage media, comprise program instructions to:
- responsive to determining that an authorization from a user is required to enroll the new device, request the authorization from the user; and
- responsive to receiving the authorization from the user, enroll the new device in the IoT network, wherein the new device is enrolled using the configuration data from the repository.

11. The computer program product of claim 10, wherein the program instructions to, responsive to receiving the authorization from the user, enroll the new device in the IoT network, wherein the new device is enrolled using the configuration data from the repository comprises one or more of the following program instructions, stored on the one or more computer readable storage media, comprise program instructions to:
- update the repository, wherein the repository is updated with the device metadata from the new device.

12. The computer program product of claim 9, wherein the program instructions to, responsive to verifying the device metadata with the device manufacturer, gather the configuration data for the new device from the repository, wherein the configuration data is gathered from the one or more devices with the same context type in the repository comprises one or more of the following program instructions, stored on the one or more computer readable storage media, comprise program instructions to:
- responsive to the device manufacturer not verifying the device metadata, request authorization to enroll the new device from a user; and
- responsive to receiving the authorization from the user, gather the configuration data for the new device from the repository, wherein the configuration data from the repository is gathered from the one or more devices with the same context type.

13. The computer program product of claim 9, wherein the program instructions to, responsive to confirming the device metadata with the device manufacturer, gather the configuration data for the new device from the repository, wherein the configuration data is gathered from the one or more devices with the same context type in the repository comprises one or more of the following program instructions, stored on the one or more computer readable storage media, comprise program instructions to:
- responsive to confirming the device metadata with the device manufacturer, determine whether the device metadata conforms to at least one rule in a set of predetermined rules;
- update the repository with manufacturer data, wherein the manufacturer data includes at least one of classifications and configurations with known information; and
- gather the configuration data for the new device from the repository, wherein the configuration data is gathered from the one or more devices with the same context type in the repository.

14. The computer program product of claim 9, further comprising program instructions to:
- configure the new device using the configuration data from the repository, wherein the configuration data is gathered from the one or more devices with the same context type in the repository.

15. A computer system comprising:
- one or more computer processors;
- one or more computer readable storage media; and
- program instructions stored on the one or more computer readable storage media for execution by at least one of the one or more computer processors, the stored program instructions including instructions to:
- responsive to receiving a request to add a new device to an Internet of Things (IoT) network, request a device metadata from the new device, wherein the device metadata includes a context of the new device;
- responsive to receiving the device metadata from the new device, request verification from a manufacturer of the new device that the new device is not a false device based on the device metadata, wherein the device metadata is verified using secured information services maintained by the manufacturer of the new device, wherein the secured information services include at least one of web services and application programming interfaces (APIs) maintained by the manufacturer of the new device;
- responsive to verifying the device metadata with the device manufacturer, gather a configuration data for the new device from a repository, wherein the configuration data for the new device is gathered from one or more devices with a same context type, in the repository, as the context, type, and model of the new device included in the device metadata;

responsive to gathering the configuration data for the new device from the repository, enroll the new device in the IoT network, wherein the new device is enrolled using the configuration data including the context, type, and model of the one or more devices with the same context, type, and model;

use the context of the new device to arrange the new device in an IoT category selected from a group of IoT categories including the one or more devices with the same context, type, and model; and send a user authorization request to a network owner responsive to the new device not being able to be completely identified due to the new device containing minimal configuration data comprising the context, type, and model of the new device sufficient to uniquely identify the new device.

16. The computer system of claim 15, wherein:
the device metadata includes the context of the new device and the manufacturer of the new device, and
the requesting the device metadata, the requesting verification, the gathering the configuration data, and the enrolling the new device in the IoT network are performed by an IoT controller included in the IoT network.

17. The computer system of claim 15, wherein the program instructions to, responsive to gathering the configuration data for the new device from the repository, enroll the new device in the IoT network, wherein the new device is enrolled using the configuration data comprises one or more of the following program instructions, stored on the one or more computer readable storage media, comprise program instructions to:

responsive to determining that an authorization from a user is required to enroll the new device, request the authorization from the user; and responsive to receiving the authorization from the user, enroll the new device in the IoT network, wherein the new device is enrolled using the configuration data from the repository.

18. The computer system of claim 17, wherein the program instructions to, responsive to receiving the authorization from the user, enroll the new device in the IoT network, wherein the new device is enrolled using the configuration data from the repository comprises one or more of the following program instructions, stored on the one or more computer readable storage media, comprise program instructions to:

update the repository, wherein the repository is updated with the device metadata from the new device.

19. The computer system of claim 15, wherein the program instructions to, responsive to verifying the device metadata with the device manufacturer, gather the configuration data for the new device from the repository, wherein the configuration data is gathered from the one or more devices with the same context type in the repository comprises one or more of the following program instructions, stored on the one or more computer readable storage media, comprise program instructions to:

responsive to the device manufacturer not verifying the device metadata, request authorization to enroll the new device from a user; and responsive to receiving the authorization from the user, gather the configuration data for the new device from the repository, wherein the configuration data from the repository is gathered from the one or more devices with the same context type.

20. The computer system of claim 15, wherein the program instructions to, responsive to confirming the device metadata with the device manufacturer, gather the configuration data for the new device from the repository, wherein the configuration data is gathered from the one or more devices with the same context type in the repository comprises one or more of the following program instructions, stored on the one or more computer readable storage media, comprise program instructions to:

responsive to confirming the device metadata with the device manufacturer, determine whether the device metadata conforms to at least one rule in a set of predetermined rules;

update the repository with manufacturer data, wherein the manufacturer data includes at least one of classifications and configurations with known information; and gather the configuration data for the new device from the repository, wherein the configuration data is gathered from the one or more devices with the same context type in the repository.

* * * * *